June 24, 1930.    R. O. BEERHALTER    1,767,339
JUNCTION BOX FIXTURE
Filed May 16, 1929

Inventor
R. O. Beerhalter

By *Clarence A. O'Brien*
Attorney

Patented June 24, 1930

1,767,339

UNITED STATES PATENT OFFICE

RHINEHART O. BEERHALTER, OF JUNCTION CITY, KANSAS

JUNCTION-BOX FIXTURE

Application filed May 16, 1929. Serial No. 363,617.

This invention relates to electrical appliances and accessories and has more particular reference to a pair of especially constructed brackets for use in conjunction with a junction wall box and broadly referred to as fixtures.

These special fixtures are expressly designed for use in conjunction with junction boxes employed in plastic building walls for cooperation with switches, cord plugs and sockets and the like.

As a rule the switch structure is bolted to the junction box and a multiplicity of washers are employed for boosting the switch outwardly to render it substantially flush with the plaster with a view toward relieving the plaster of direct pressure from the cover or facing plate.

From experience I find that it is unhandy and inconvenient as well as frequently impractical to do a good job with some makeshift accessories.

Therefore, I have evolved and produced a pair of novel brackets or fixtures which cooperate with the switch the junction box and the wall in a manner to permit proper placement of the switch to render it flush with the exposed surface of the wall.

Each bracket is made to facilitate attachment thereof and to facilitate proper backing of the switch structure.

More specifically stated, in carrying the invention into actual practice, I have evolved and produced a simple and inexpensive bracket which includes an apertured attaching ear, bracing means which telescopes into the junction box, and a projection providing a stop for an abutment for cooperation with the switch attaching means.

In accordance with the invention, a portion of the bracing means is in the form of a ring, attached to the body portion through a scored connection, whereby to permit the easy severing of this ring and to permit it to be employed as a washer. Likewise the attaching ear is of a fragile nature to permit it to be cut off and also used as a washer. Then too, the extension or abutment portion of the bracket is scored to permit it to be shortened to the desired length by permitting it to be simply clipped off through the medium of common cutting pliers.

These features and advantages will become more readily apparent from the following description and drawings.

Figure 1:
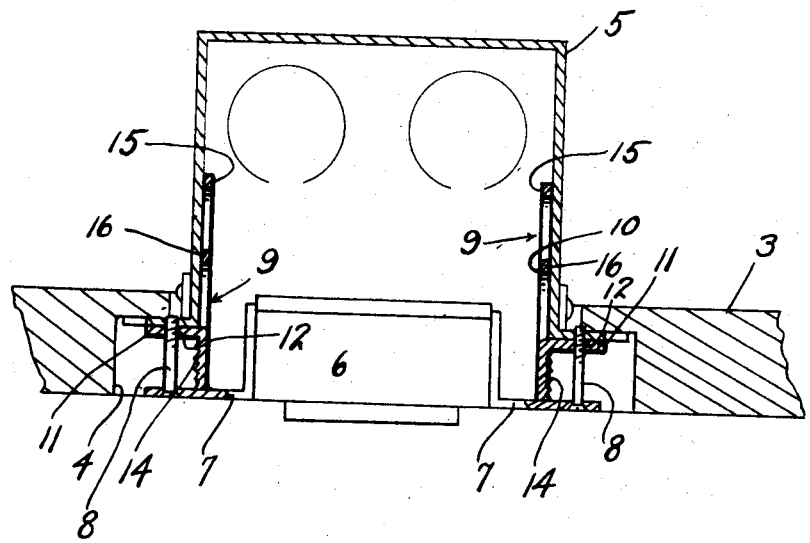
Figure 1 is a view in section and elevation showing a portion of a wall, a juncture box, a switch, switch mounting means, and a pair of the improved bracing brackets in place.

In the drawings, the reference character 3 designates a wall having a portion cut out to provide a socket at 4. The junction box, which is of ordinary construction is designated by the reference character 5 and includes a marginal flange projecting into the socket. The switch or electrical accessory to be connected with the box is designated by the reference character 6. This is provided with attaching means including laterally directed arms 7, fastened to the flange of the box by bolts or screws 8. These details are of ordinary construction and as before stated, in the usual practice, washers are placed in between the arm 7 and the box flange and surrounding bolt 8 to boost the switch device 6 outwardly to render it substantially flush with the exposed surface of the wall 3.

It is obvious that a pair of special fixtures or brackets are associated with each junction box. This bracket is the same in construction and a description of one will suffice for both.

Figure 2:
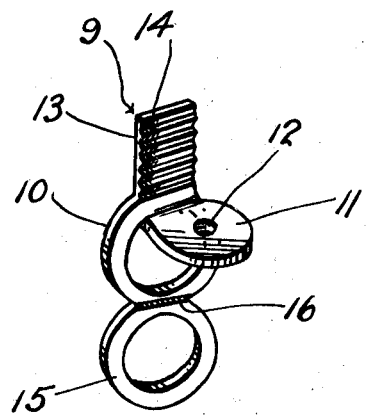
Figure 2 is a perspective view of the bracket as constructed in accordance with the present invention.

Referring to Figure 2, it will be seen that the brackets, in each instance are designated by the reference character 9. It comprises a metal stamping including a body portion 10 having an ear 11 struck out therefrom. This ear is apertured as at 12 to permit passage of the bolt 8.

In practice the ear is bent outwardly to permit it to lie against the flange of the junction box as seen in Figure 1. It therefore provides a means for attaching the bracket to the box. Projecting outwardly beyond the body is an extension 13 which functions as a bracing element, a spacing element, or an abutment for cooperation with the adjacent arm 7. In other words, the arm 7 bears against this extension and it is to be cut off to the desired length to insure proper flush placement of the switch 6. As before intimated, this extension is transversely scored as indicated at 14 and each of the score lines are intended to facilitate clipping off the end portion to adjust it to the desired length.

The body also carries a ring like part 15, joined to the body by a score line 16. Thus the parts 14 and 15 are of a rather fragile nature. As a matter of fact, the attaching ear 11 is also joined to the body in a manner to permit it to be readily severed if desired.

As seen in Figure 1, this part 15 operates primarily as a brace to engage the interior of the adjacent wall of the box. In many instances, it will be found inexpedient, possibly, to employ the complete bracket. If, under such conditions it is desirable to use only washers for boosting the switch position, the parts 11 and 15 may be cut off with ordinary cutting pliers to be placed around the bolt 8. Thus, the bracket has the additional function of providing washers whenever occasion demands.

It is understood that the brackets are placed in position as seen in Figure 1, with the scored abutments 13 bearing against the arms 7 of the mounting means for the switch 6. The abutments are cut off to the desired length to dispose the switch in substantially flush relation with the walls. Then, when the cover and facing plate (not shown) is put in position it will have a metallic backing and will be prevented from being forced into the easily breakable wall plaster.

From the description and drawings, it will be seen that I have evolved and produced simple and inexpensive means which facilitate the proper placement and installation of junction boxes and wall switches and the like.

The simplicity is such, however, as to make it unnecessary to enter into a more detailed description. As a matter of fact, it is thought that persons skilled in the art to which the invention relates will be able to obtain a clear understanding of the advantages and features after considering the description in conjunction with the drawings. Therefore a more lengthy description is regarded as unnecessary.

Minor changes in shape, size and rearrangement of features coming within the field of invention claimed, may be resorted to, in actual practice, if desired.

I claim:

1. In a structure of the class described, in combination, a support having a socket formed therein, a junction box having a flange located in said socket, a switch, mounting means for the switch including attaching arms, bolts connecting said arms with the box flanges, and a pair of brackets attached to said bolts and including portions bearing against said arms, said portions being in the form of extensions functioning as abutments, and said abutments being transversely scored to facilitate shortening by severing with cutting pliers and the like.

2. As a new product of manufacture, a junction box bracket comprising a body, having attaching means and provided with an extension functioning as an abutment, said extension being rendered comparatively fragile by the provision of transverse longitudinally spaced score lines to facilitate cutting off fractions thereof to adjust the length of the abutment.

3. As a new product of manufacture, a junction box bracket comprising a body, an apertured attaching ear carried by said body, an abutment carried by said body, and a bracing ring also carried by said body, said bracing ring and ear being attached to the body through the medium of scored portions to facilitate severing, whereby to permit the severed parts to be utilized as boosting washers.

In testimony whereof I affix my signature.

RHINEHART O. BEERHALTER.